Patented June 17, 1947

2,422,400

UNITED STATES PATENT OFFICE

2,422,400

PRODUCTION OF N-METHYLAMIDES

Mark Wendell Farlow, Wilmington, Del., assignor to E. I. du Pont de Nemours & Company, Wilmington, Del., a corporation of Delaware No Drawing. Application April 7, 1944,
Serial No. 530,041

7 Claims. (Cl. 260—309)

1

This invention relates to the preparation of N-methylamides, and more particularly to novel methods for preparing such compounds through catalytic hydrogenation.

Prior methods for obtaining N-methylamides possess many disadvantages, especially in respect to yields, economy, efficiency of operation and simplicity, which disadvantages render such prior methods unattractive for wide commercial exploitation. It is among the objects of this invention to overcome these as well as other disadvantages inherent in such prior procedures, and to provide, in particular, a novel, simple and highly efficient catalytic process for preparing N-methylamides; to provide a new and effective catalytic hydrogenation process for converting N-methylol and N-alkoxy methylamides to the corresponding N-methylamides; to provide a simple, practical, economical and efficient process for converting said N-methylol and N-alkoxy methyl derivatives of aliphatic amides to the corresponding N-methyl derivatives in high yields and with a minimum of undesirable side reaction products; and to provide a simple, practical, efficient catalytic process for converting N-methylol and N-methoxy methylureas to the corresponding N-methyl derivatives. Other objects and advantages of the invention will be apparent from the following description thereof:

The above and other objects are accomplished in this invention which broadly comprises reacting a N-methylol or N-alkoxy methylamide with hydrogen in the presence of an active metal hydrogenation catalyst at a temperature in excess of about 50° C. and at a pressure above atmospheric.

In a more specific and preferred embodiment, the invention comprises obtaining a N-methylamide through conversion of a N-methylol or N-methoxy methylamide by reacting said amide with hydrogen in the presence of an active metal hydrogenation catalyst at a temperature ranging from about 100–125° C. and at a pressure above 100 lbs./sq. in.

In accordance with one preferred mode of practicing the invention, a suitable pressure vessel is charged with a suitable amount of bis(methoxymethyl) urea, or the N-methylol or N-alkoxy methyl derivative whose N-methyl derivative it is desired to obtain, a suitable organic solvent, e. g., a short chain, saturated, aliphatic alcohol, such as methanol, in amount sufficient to give a 20–50% solution of the amide, and an active hydrogenation catalyst in amount ranging from about 5–10% by weight of the N-methylol or N-alkoxy

2 methylamide. The reactor is then closed, hydrogen is admitted, and the contents heated to temperatures ranging from about 100–125° C. and agitated. Throughout the reaction the pressure is maintained at from about 1000–2000 lbs./sq. in., this being conveniently effected by periodically repressuring with hydrogen. After there is no further drop in pressure, the reactor is opened and discharged. The reaction mixture is filtered to separate the catalyst and the filtrate distilled to remove the solvent and recover the reaction product.

Since the exact manner of practicing this invention will vary somewhat in the conditions employed, depending upon the particular N-methylol or N-alkoxymethylamide being processed, the invention is best described by means of the following examples of its practice.

Example I

Into a high pressure reactor is charged 50 g. of bis(methoxymethyl) urea, 150 cc. of methanol, and 15 g. of nickel catalyst (ethanol paste), prepared as described hereinafter. Hydrogen is forced into the reactor until the total pressure is 2,000 lbs./sq. in. at 100° C. and the contents are agitated. At 100° C. the reaction is rapid and additional hydrogen is introduced into the reactor to replace that used up and maintain the total pressure between 1000 and 2000 lbs./sq. in. After six hours no more hydrogen is absorbed and the reaction is complete. After cooling, the autoclave is opened, discharged, the contents filtered to remove the catalyst, and the filtrate distilled to remove the solvent. There is thus obtained 28 g. of s-dimethylurea melting at 95 to 100° C.

The nickel catalyst used in the above example can be conveniently prepared as follows:

50 g. of finely-powdered alloy composed of nickel and aluminum is suspended by stirring in 300 cc. of boiling water. To this is added slowly a solution of 50 g. of sodium hydroxide in 100 cc. of water and the mixture is boiled for four hours. The supernatant liquid is then replaced with a fresh solution of 50 g. of sodium hydroxide in 300 cc. of water and the mixture boiled for an additional four hours. The finely-divided nickel so formed is washed with water (decantation) until free from alkali and then stored under ethanol until used. This catalyst is very pyrophoric and must not be exposed to air unless stabilized.

Example II

A high pressure reactor is charged with 1,085 g. of s-bis(methoxymethyl) ethyleneurea, 2,500 cc. of methanol, and 200 g. of nickel catalyst (ethanol paste), prepared as described in Example I. Hydrogen is forced into the reactor until the total pressure is 2,000 lbs./sq. in. at 100° C. and the contents agitated. At 100° C. the reaction is rapid and additional hydrogen is introduced into the reactor to replace that used up and maintain the total pressure within the range of 1,000 to 2,000 lbs./sq. in. After two hours no more hydrogen is absorbed and the reaction is complete. After cooling, the autoclave is opened, the contents filtered and the filtrate distilled to remove the solvent. The yield of s-dimethylethyleneurea is 96% of theory.

Example III

A reaction vessel is charged with 43 g. of ethyleneurea, 30 g. of paraformaldehyde, and 95 cc. of methanol and the contents agitated at room temperature until solution is complete. To the contents of the reactor there is added a solution of 0.1 g. of sodium hydroxide in 1 cc. of water and agitation continued. After five minutes the temperature rises to 41° C. and after ten minutes sufficient phosphoric acid is added to adjust the pH from 10.0 to 7, and contents of the reactor filtered.

The solution thus obtained is charged into a pressure reactor and 15 g. of the nickel catalyst paste prepared as described in Example I is added. The reactor is closed, hydrogen added until the total pressure is 2,000 lbs./sq. in. at 100° C. and the contents agitated. At 100° C. the reaction is rapid and additional hydrogen is introduced into the reactor to replace that consumed and maintain the pressure between 1,000 and 2,000 lbs./sq. in. After four hours no more hydrogen is absorbed and the reaction is complete. The autoclave is then opened, discharged, the contents filtered to separate the catalyst and the filtrate distilled to remove the solvent. There is thus obtained a practically quantitative yield of s-dimethylethyleneurea, boiling at 108.5° C. at 19 mm.

Example IV

One hundred and three parts of N-hydroxymethyl acetamide in 75 parts of water was charged into a pressure vessel and hydrogenated in the presence of seven parts of an active cobalt catalyst as in Example III. The major reaction product was N-methyl acetamide, B. P. 98°–101° C./19 mm.

In the foregoing examples certain N-alkylol and alkoxymethylamides which can be converted to the corresponding N-methylamides according to this invention have been employed. Obviously, the process of this invention is not limited to these particular materials. In general, the catalytic hydrogenation of all N-methylol and N-alkoxymethylamides to the corresponding N-methylamides is considered as coming within the scope of this invention. Thus, in addition to those mentioned, the N-methylol or N-alkoxymethyl derivatives of the following amides are also included among those useful in the practice of this invention: Acetamide, butyramide, propionamide, stearamide, glutaramide, palmitamide, N-butylstearamide, N-phenylurea, N-tolylurea, N-cyclohexylurea, urea, succinamide, adipamide, azelamide, N-phenylbutyramide, N-N-cyclohexyllauramide, lauryllauramide, acetanilide, hexahydrobenzamide, naphthalamide, phthalimide, succinimide, adipimide and the like.

Similarly, though the above examples indicate certain conditions with respect to temperature, pressure, concentration, duration of reaction, type of catalyst used, etc., these are merely preferred. Hence, it is to be understood that these values may be varied somewhat within the scope of this invention, since the conditions of each adaptation thereof are determined by the particular N-alkoxymethyl or N-methylol amide treated, the quantity used, and the catalyst employed. It will be found that, in general, the process is operable at temperatures in the range of from about 50° to 150° C. and at pressures varying from above atmospheric to a maximum determined by the practical limitations of the reaction vessel. Usually, it will be found more advantageous to operate at a pressure in excess of 100 lbs./sq. in., a preferred range being from about 1000 to 2000 lbs./sq. in. with a temperature of from 100 to 125° C., because under these conditions the reaction proceeds at a practical rate to produce the desired products in optimum yields.

Catalysts operably useful in the invention comprise those which contain a hydrogenating metal in finely-divided form as the active catalytic component. Nickel is especially useful for this purpose and hence is preferred. In lieu of nickel, other hydrogenating metals, such as cobalt, iron, platinum and the like, may be employed. These catalysts are of two classes, namely, (1) pyrophoric metallic catalysts prepared by a method such that the active form of the metal is produced at temperatures below 150° C. or pyrophoric metals supported on an inert carrier prepared by reducing an oxide or hydroxide or carbonate of the hydrogenating metal with hydrogen at relatively high temperatures (400 to 700° C.), the catalyst not being exposed to an oxidizing atmosphere before use and (2) stabilized hydrogenating metal catalysts prepared by exposure of the pyrophoric metal catalysts prepared as described above to an oxidizing atmosphere while maintaining the temperature of the catalyst mass below 50° C.

If a supporting material is used, it may be a form of silica such as kieselguhr or it may be magnesia or alumina and may be added during the catalyst preparation or formed during the catalyst preparation.

As already indicated, the process of this invention is preferably carried out in the presence of an organic solvent such as an aliphatic alcohol. It may also be carried out in the presence of ether or hydrocarbon solvents. Among examples of specific inert solvents utilizable herein may be mentioned water, methanol, ethanol, dioxane, toluene, and the like. The preferred solvent, as already stated, is methanol, or, in the case of alkoxy derivatives, the alcohol corresponding to the alkoxy group. Alternatively and if desired, the process can be operated in the absence of a solvent.

In Example III above, paraformaldehyde has been used to react with ethyleneurea in forming, in situ, the amide derivative to be reacted upon. In lieu thereof, other forms of formaldehyde which react with amides to form methylol or alkoxymethyl derivatives can be used. For example, formaldehyde, trioxymethylene, tetraoxymethylene, and the like, may be used for such purpose.

The instant process is highly useful for the preparation of N-methyl derivatives of amides. From the unsubstituted amides there may be produced either the corresponding symmetrically substituted N-dimethyl amides, as illustrated by the examples, or N-monomethyl substituted amides depending upon whether the starting material is the mono or di substituted N-alkoxymethyl or N-methylol amide. Where the starting material is the N-alkoxymethyl or N-methylol derivative of an imide or of a mono substituted amide, only monomethyl derivatives can be obtained.

As already noted, the invention offers many advantages over the prior art from the standpoint of economy, efficiency, and simplicity, and provides a new and effective catalytic hydrogenating process for converting N-alkoxymethyl and N-methylol amides to the corresponding N-methylamides in high yields and with minimum of undesirable side reaction products. By this process N-dimethyl derivatives of amides and especially N-dimethyl derivatives of ureas which are valuable products having many industrial uses as such or as intermediates in the manufacture of other industrial products are made easily accessible.

I claim as my invention:

1. A process for obtaining N-methylamides which comprises reacting a carbonamide compound selected from the group consisting of N-methylol and N-alkoxy methylamides with hydrogen in the presence of an active metal hydrogenation catalyst, at a temperature ranging from about 50° C. to 150° C. and under a superatmospheric pressure above about 100 pounds per square inch.

2. A process for obtaining N-methylamides which comprises reacting a carbonamide compound selected from the group consisting of N-methylol and N-alkoxy methylamides with hydrogen in the presence of an active nickel hydrogenation catalyst, at a temperature of about 50–150° C. and at a pressure above about 100 lbs./sq. in.

3. A process for obtaining N-methylamides which comprises reacting a carbonamide compound selected from the group consisting of N-methylol and N-methoxy methylamides with hydrogen in the presence of an active metal hydrogenation catalyst, at a temperature of about 100–125° C. and at a pressure ranging from about 1000–2000 lbs./sq. in., the proportion of catalyst present ranging from about 5–10% by weight of the amide being converted.

4. A process for producing N-methylamides comprising reacting over an active metal hydrogenation catalyst, and in the presence of an inert solvent, a carbonamide compound selected from the group consisting of N-methylol and N-alkoxy methylamides, with hydrogen, said reaction being effected at a temperature in excess of 50° C. and not exceeding about 150° C. under a pressure in excess of 100 lbs./sq. in., the proportion of catalyst employed in the reaction ranging from 5–10% by weight of the amide being converted.

5. A process for obtaining a N-methylamide through catalytic conversion which comprises reacting at a temperature ranging from 100–125° C. and under a pressure of from 1000–2000 lbs./sq. in. bis(methoxymethyl) urea with hydrogen, said reaction being conducted in the presence of methanol and an active nickel hydrogenation catalyst, the proportion of catalyst present ranging from 5–10% by weight of the bis(methoxymethyl) urea being converted.

6. A process for obtaining a N-methylamide through catalytic conversion which comprises reacting at a temperature ranging from 100–125° C. and under a pressure of from 1000–2000 lbs./sq. in. s-bis(methoxymethyl) ethyleneurea with hydrogen, said reaction being conducted in the presence of methanol and an active nickel hydrogenation catalyst, the proportion of catalyst present ranging from 5–10% by weight of the s-bis(methoxymethyl) ethyleneurea being converted.

7. A process for obtaining a N-methylamide through catalytic conversion which comprises reacting at a temperature ranging from 100–125° C. and under a pressure of from 1000–2000 lbs./sq. in. N-hydroxymethyl acetamide with hydrogen, said reaction being conducted in the presence of methanol and an active nickel hydrogenation catalyst, the proportion of catalyst present ranging from 5–10% by weight of the N-hydroxymethyl acetamide being converted.

MARK WENDELL FARLOW.

REFERENCES CITED

The following references are of record in the file of this patent:

UNITED STATES PATENTS

| Number | Name | Date |
|---|---|---|
| 1,990,245 | Mueller | Feb. 5, 1935 |
| 2,290,439 | Lenth | July 21, 1942 |

OTHER REFERENCES

Jour. Am. Chem. Soc., vol. 37 (1935), pages 147–151; Jour. Am. Chem. Soc., vol. 54 (1932), pages 4678–4690. (Copies in Scientific Library, U. S. Patent Office, Washington, D. C.)